(No Model.)
P. CASAMAJOR, Dec'd.
L. J. CASAMAJOR, Executrix.
PROCESS OF TREATING LIQUIDS IN VACUUM PANS.
No. 378,230. Patented Feb. 21, 1888.
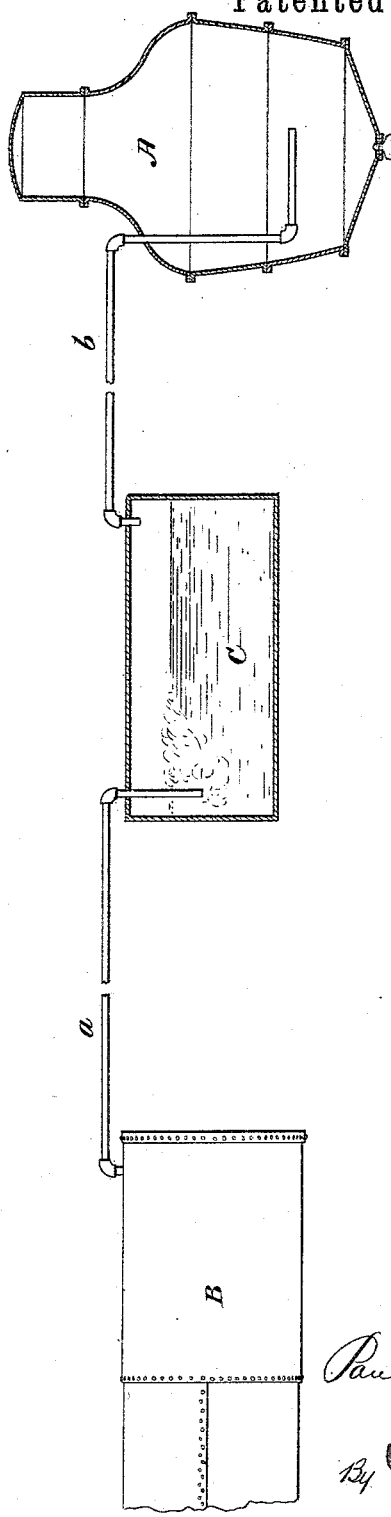
Attest:
Geo. T. Smallwood.
C. J. Hedrick
Inventor;
Paul Casamajor
By A. Pollok
his attorney

UNITED STATES PATENT OFFICE.

PAUL CASAMAJOR, OF BROOKLYN, NEW YORK; LOUISE J. CASAMAJOR EXECUTRIX OF SAID PAUL CASAMAJOR, DECEASED.

PROCESS OF TREATING LIQUIDS IN VACUUM-PANS.

SPECIFICATION forming part of Letters Patent No. 378,230, dated February 21, 1888.

Application filed June 30, 1887. Serial No. 243,022. (No model.)

*To all whom it may concern:*

Be it known that I, PAUL CASAMAJOR, of Brooklyn, in the county of Kings and State of New York, have invented a new and useful Improvement in the Process of Treating Liquids in Vacuum-Pans, which improvement is fully set forth in the following specification.

This invention relates to the treatment of liquids—such, for example, as saccharine solutions—in vacuum-pans; and it consists, essentially, in conducting a current of steam from a generator to and through an auxiliary vessel containing water or other liquid, and thence to the vacuum-pan, for the purpose of facilitating the evaporation, determining the departure of gases or volatile matters, or lowering the temperature of the liquid. The steam employed may be taken direct from a steam-boiler at the ordinary temperature and pressure, or it may be superheated; or (which is preferred) its temperature and pressure may be reduced, as by allowing it to expand or condense partially. The said auxiliary vessel is partly filled with water or other liquid. The hot steam from the boiler passes into the liquid of the auxiliary vessel, the introduction of the steam being so regulated that the liquid in the auxiliary vessel will boil at any desired temperature below the normal on account of the connection between this vessel and the vacuum-pan. By so reducing the temperature of the steam before introducing it into the vacuum-pan the form of agitation called "bumping" is avoided, while the auxiliary vessel may be so constructed that bumping will not injure it.

In order that the invention may be fully understood, I will describe the manner in which the same is or may be carried into effect, reference being had to the accompanying drawing, which represents, diagrammatically, a vacuum-pan, A, connected with a steam-boiler, B, through an intermediate or auxiliary vessel, C.

The pipe *a* conveys the steam from the boiler B and discharges it below the level of the liquid in vessel C. The latter is connected directly with the vacuum-pan A by the pipe *b*, the end of which dips below the level of the liquid in vacuum-pan A.

If a sugar solution at a temperature of 150° Fahrenheit be placed in the vacuum-pan A (communication with the steam-generator being cut off and no further artificial heat being applied) and the vacuum-pump be set in operation, the liquid boils until its temperature falls to 135° Fahrenheit, when ebullition ceases and the temperature remains constant. Now, by admitting hot steam direct from the boiler B into the solution in the vacuum-pan the liquid boils anew, and the temperature at the end of ten minutes goes up to 140° Fahrenheit. By passing the steam first through the auxiliary vessel C, thus reducing its temperature and pressure, and then admitting it into the vacuum-pan, the solution in the latter is kept boiling, giving off water vapors until at the end of ten minutes the temperature of the liquid falls to 110° Fahrenheit.

I claim—

The herein-described process of treating saccharine solutions or other liquids by placing the same in a vacuum-pan, creating and maintaining a vacuum therein until the temperature falls and ebullition ceases, then conducting a current of steam to and through a liquid contained in an auxiliary vessel, thereby reducing its temperature and pressure, and, finally, introducing it into the vacuum-pan, substantially as described.

In testimony whereof I have signed this specification in the presence of two subscribing witnesses.

PAUL CASAMAJOR.

Witnesses:
BENJ. T. ROGERS,
HARRY E. BURNETT.